Figure 1:
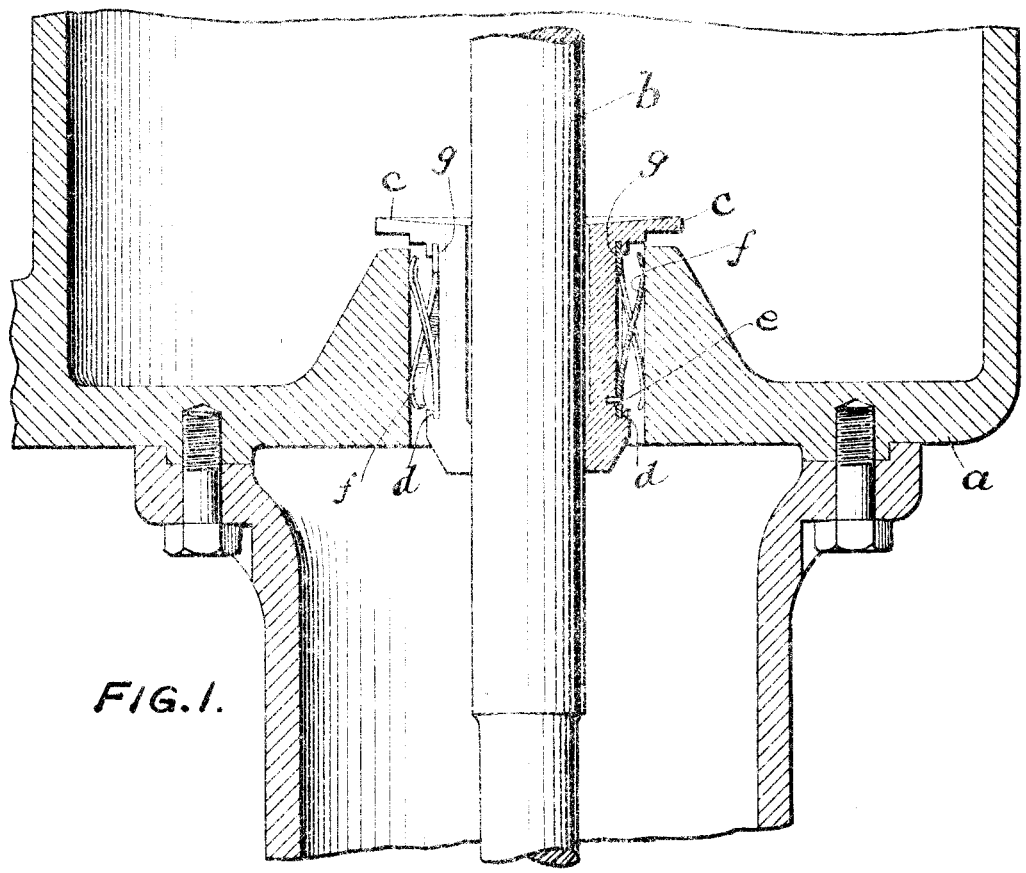

T. H. MILLER.
SPRING BEARING.
APPLICATION FILED JUNE 29, 1911.

1,107,691.

Patented Aug. 18, 1914.
2 SHEETS—SHEET 1.

WITNESSES:
Rob R Ketchel
E. E. Wall

INVENTOR
Theodore H Miller
BY
ATTORNEYS.

T. H. MILLER.
SPRING BEARING.
APPLICATION FILED JUNE 29, 1911.

1,107,691.

Patented Aug. 18, 1914.
2 SHEETS—SHEET 2.

WITNESSES:

INVENTOR

BY

ATTORNEYS

UNITED STATES PATENT OFFICE.

THEODORE H. MILLER, OF POUGHKEEPSIE, NEW YORK, ASSIGNOR TO THE DE LAVAL SEPARATOR COMPANY, A CORPORATION OF NEW JERSEY.

SPRING-BEARING.

1,107,691.

Specification of Letters Patent. Patented Aug. 18, 1914.

Application filed June 29, 1911. Serial No. 635,992.

*To all whom it may concern:*

Be it known that I, THEODORE H. MILLER, a citizen of the United States, residing at Poughkeepsie, county of Dutchess, and State of New York, have invented a new and useful Improvement in Spring-Bearings, of which the following is a full, clear, and exact description, reference being had to the accompanying drawings, which form a part of this specification.

My invention relates to certain improvements in spring bearings, particularly applicable to power driven centrifugal machines. In such machines, the spring bearing generally used comprises a bearing formed in sections to allow a movement to prevent "freezing" of the spindle thereto. This bearing is spring supported as follows: The outer surface of the bearing is polygonal. Against the flat sides of the polygon rest plunger springs, which pass radially through a support which is inserted in the frame. This arrangement is not highly effective, because, for instance, the number of springs must be limited and any one spring breaking or becoming ineffective the spring support is materially affected. Again, it requires two pieces separate from the machine, the bearing and the support.

In my improved spring bearing, I form the bearing, as before, in sections, but such bearing is provided, top and bottom, with an under cut groove. I use instead of the spring plungers a series of spring fingers or series of groups of fingers. Each of these fingers, or groups of fingers, has a solid portion, rounded to conform to the curvature of the bearing, and adapted to enter the under cut groove. Such solid portion is also provided with an orifice adapted to be inserted over a pin, secured to the bearing for preventing the spring finger or groups of fingers dropping out. The outer surface of the bearing is rounded. This arrangement has, among others, the following advantages: The bearing, being rounded, requires no separate support and the support may be formed in the frame itself. The fingers or groups of fingers are interchangeable and may be used at any point, top or bottom. The breaking of a single finger, or group of fingers, produces but slight effect. The bearing may be readily assembled or disassembled for adjustment or repairs, by the operator without the aid of any tools. The spring length is very great compared with the plunger springs. Indeed such length may be greater than the width or length of the bearing.

I will now describe the embodiment of my invention shown in the accompanying drawings, in which—

Figure 2:
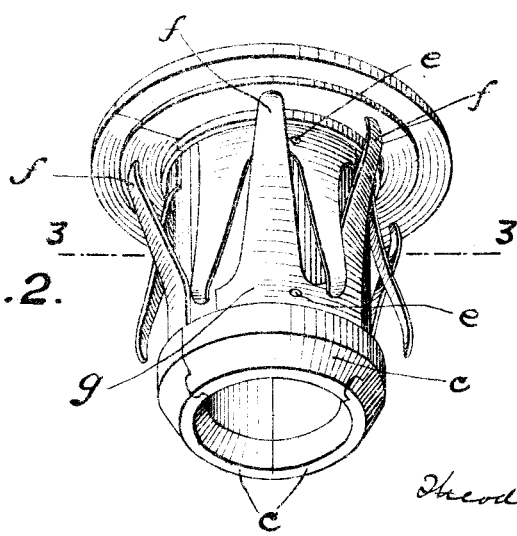
Figure 3:
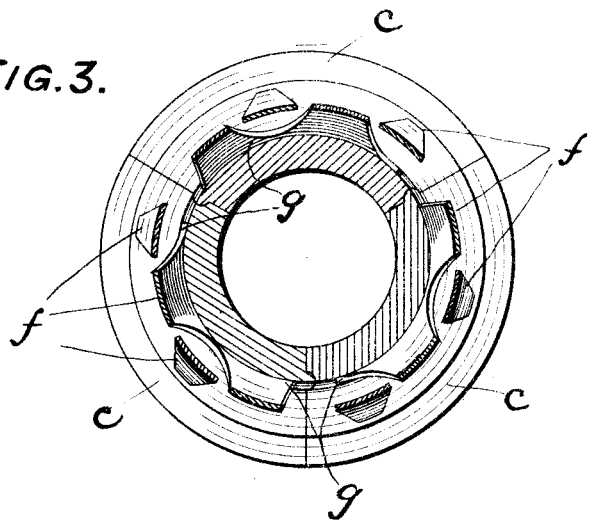
Figure 4:
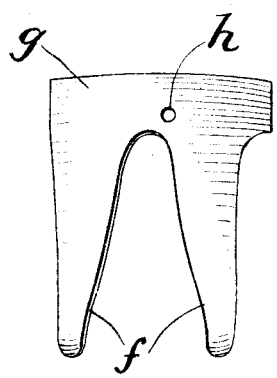

Figure 1 is a sectional view of a portion of centrifugal separator, embodying my improved spring bearing. Fig. 2 is a detail perspective view of the bearing. Fig. 3 is a section on the line 3—3, Fig. 2. Fig. 4 is a detail view of spring fingers.

$a$ is the casing of a centrifugal separator bowl, $b$ the spindle. The bearing is formed in sections $c$. Each section, top and bottom, has the under cut groove $d$ and the pin $e$.

$f$ are spring fingers and $g$ the solid portion to which they are connected, as shown, in pairs. The outer surface of the solid portion is curved to correspond with the curvature of the bearing and is, therefore, interchangeable, top or bottom, or at any portion of the bearing. This solid portion has the orifice $h$, in which the pin $e$ may enter. In practice, the solid portion is slipped into the under cut groove and the pin $e$ entered in the orifice $h$.

The length of the spring fingers $f$ may be the full length of the bearing or, indeed, greater, thus producing a long or extended spring action. The exterior of the bearing is curved, which enables the frame itself to form the bearing, thus dispensing with a separate bearing holder.

Having now fully described my invention, what I claim and desire to protect by Letters Patent is—

1. A spring bearing comprising a surrounding casing, an inner bearing having two sets of similarly arranged pins projecting out from its periphery respectively near its upper and lower ends, and two separate sets of interchangeable fingers, each set of fingers composed of a plurality of separate groups of fingers and each group of fingers being composed of a plurality of fingers united together at one end and provided at that end with an orifice adapted to engage one of said pins, the opposite free end portions of the fingers adapted to engage the casing.

2. A spring bearing comprising an inner bearing and an outer bearing one of which has at its upper end a downwardly extending undercut groove and a plurality of pins projecting from the periphery below the groove and at its lower end a similar upwardly extending undercut groove and a similar arrangement of pins above the last named groove, and two separate sets of spring fingers, each set composed of independent interchangeable groups of spring fingers having orifices near one end, one set of which fingers extends within the upper groove and registers through its orifices with the upper pins and contacts with the lower part of the other bearing, while the other set extends within the lower groove and registers through its orifices with the lower pins and contacts with the upper part of the other bearing.

3. A spring bearing comprising an inner bearing, an outer bearing, one of said bearings having similar upper and lower spring engaging means, two sets of springs each of which sets is composed of a plurality of separate spring finger units each of which is composed of a plurality of fingers united at one end and adapted at that end for independently detachable engagement with any of said spring engaging means, one set of spring finger units being engaged with the upper spring engaging means while the other set is engaged with the lower spring engaging means, the unsecured free end portions of the units of each set engaging the other bearing at approximately the level of the secured ends of the units of the other set.

4. A spring bearing comprising a bearing formed in sections each of which is provided with upper and lower spring engaging means, two sets of springs each of which sets is composed of a plurality of separate spring finger units, each of which is composed of a plurality of fingers united together at one end, each of said units conforming at its finger-uniting end to one of the bearing sections and engaging one of the spring engaging means thereof and at its opposite free end portions being spaced from such bearing sections approximately opposite the other spring engaging means thereof.

5. A spring bearing comprising a bearing in sections, spring fingers in groups, the connecting metal of said fingers in each group conforming to the length of a section of the bearing, each section of the bearing having top and bottom an under cut groove adapted to the connecting metal.

6. A spring bearing comprising a bearing in sections, spring fingers in groups, the connecting metal of said fingers in each group conforming to the length of a section of the bearing, each section of the bearing having top and bottom an under cut groove adapted to the connecting metal, and a pin in each section, there being an orifice in the connecting metal of each group of fingers, coacting with said pin.

7. A spring bearing, comprising a bearing in sections, spring fingers in groups, the connecting metal of said fingers in each group conforming to the length and curvature of a section of the bearing, each section of the bearing having top and bottom an under cut groove adapted to the connecting metal, and means to connect the finger connections and bearing.

8. A spring bearing, comprising a bearing in sections, spring fingers in groups, the connecting metal of said fingers in each group conforming to the length and curvature of a section of the bearing, each section of the bearing having top and bottom an under cut groove adapted to the connecting metal, a pin in each section and there being an orifice in the connecting metal of each group of fingers coacting with said pin.

9. A spring bearing comprising a bearing in sections, spring fingers in groups, the connecting metal of said fingers in each group conforming to the section of the bearing, each section of the bearing having top and bottom an under cut groove adapted to the connecting metal, a pin in each section and there being an orifice in the connecting metal of each group of fingers, coacting with said pin.

10. A spring bearing, comprising a bearing in sections, spring fingers in groups, the connecting metal of said fingers in each group conforming to the curvature of a section of the bearing, each section of the bearing having top and bottom an under cut groove adapted to the connecting metal, and means to connect the finger connections and bearing.

11. A spring bearing, comprising a bearing in sections, spring fingers in groups, the connecting metal of said fingers in each group conforming to the curvature of a section of the bearing, each section of the bearing having top and bottom an under cut groove adapted to the connecting metal, a pin in each section and there being an orifice in the connecting metal of each group of fingers coacting with said pin.

12. A spring bearing comprising an inner bearing and an outer bearing one of which has at its upper end a downwardly extending undercut groove and a plurality of pins projecting from the periphery below the groove and at its lower end a similar upwardly extending undercut groove and a similar arrangement of pins above the last named groove, and two separate sets of similar spring finger units having orifices near one end, one set of which extends within the upper groove and registers through its orifices with the upper pins and contacts with the lower part of the other bearing, while the other set extends within the lower groove and registers through its orifices with the lower pins and contacts with the upper part of the last named bearing, each spring finger unit being separate and by the foregoing construction readily applied and removed and interchangeable with the other spring finger units of both sets.

In testimony of which invention, I have hereunto set my hand, at Philadelphia, on this 28th day of June, 1911.

THEODORE H. MILLER.

Witnesses:
M. M. HAMILTON,
E. E. WALL.